US006810321B1

(12) United States Patent
Cook

(10) Patent No.: US 6,810,321 B1
(45) Date of Patent: Oct. 26, 2004

(54) VEHICLE TRAFFIC MONITORING USING CELLULAR TELEPHONE LOCATION AND VELOCITY DATA

(75) Inventor: Fred S. Cook, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 10/390,307

(22) Filed: Mar. 17, 2003

(51) Int. Cl.[7] ............................ G06F 19/00; G06G 7/70

(52) U.S. Cl. ........................ 701/117; 701/118; 701/119; 340/905; 340/934; 340/936; 340/995.13; 455/456.1

(58) Field of Search ................................ 340/933, 935, 340/995.13, 988–993, 901–905, 910–912, 934, 936; 455/414.2, 414.3, 456.1, 456.2, 456.3, 456.5, 456.6, 457; 701/117–119, 200–201, 207–210, 25–26

(56) References Cited

U.S. PATENT DOCUMENTS

| | | | | | |
|---|---|---|---|---|---|
| 5,684,475 | A | | 11/1997 | Krause et al. | 340/934 |
| 5,812,069 | A | | 9/1998 | Albrecht et al. | 340/905 |
| 5,884,212 | A | | 3/1999 | Lion | 701/117 |
| 5,933,100 | A | | 8/1999 | Golding | 340/995.13 |
| 6,012,012 | A | | 1/2000 | Fleck et al. | 701/117 |
| 6,061,625 | A | | 5/2000 | Fastenrath | 701/117 |
| 6,092,020 | A | | 7/2000 | Fastenrath et al. | 701/119 |
| 6,144,916 | A | | 11/2000 | Wood, Jr. et al. | 701/200 |
| 6,150,961 | A | | 11/2000 | Alewine et al. | 340/995.1 |
| 6,236,933 | B1 | | 5/2001 | Lang | 701/117 |
| 6,259,377 | B1 | | 7/2001 | Noecker et al. | 340/933 |
| 6,333,703 | B1 | | 12/2001 | Alewine et al. | 340/995.13 |
| 6,381,533 | B1 | | 4/2002 | Crane et al. | 701/200 |
| 6,401,027 | B1 | * | 6/2002 | Xu et al. | 701/117 |
| 6,426,709 | B1 | | 7/2002 | Becker et al. | 340/992 |
| 6,510,377 | B2 | * | 1/2003 | Phung et al. | 701/117 |
| 6,522,970 | B2 | * | 2/2003 | Kerner | 701/117 |
| 6,577,946 | B2 | * | 6/2003 | Myr | 701/117 |
| 6,587,781 | B2 | * | 7/2003 | Feldman et al. | 701/117 |
| 6,594,576 | B2 | * | 7/2003 | Fan et al. | 701/117 |
| 2002/0082766 | A1 | * | 6/2002 | Ormson | 701/117 |
| 2004/0034467 | A1 | * | 2/2004 | Sampedro et al. | 701/201 |
| 2004/0039516 | A1 | * | 2/2004 | Willembrock | 701/117 |

FOREIGN PATENT DOCUMENTS

| | | | | |
|---|---|---|---|---|
| CA | 2257438 A1 | * | 11/1999 | G08G/1/052 |

* cited by examiner

*Primary Examiner*—Jacques H. Louis-Jacques

(57) ABSTRACT

A vehicular traffic monitoring system communicates with a plurality of mobile communication devices carried in moving vehicles and capable of determining their respective geographic positions and velocities. A data collector receives data samples from the plurality of mobile communication devices, each data sample comprising instantaneous location and velocity information of a respective mobile telephone at a respective time. A road segment identifier is coupled to the data at the collector for matching data samples wherein a respective instantaneous location corresponds to one of a plurality of road segments monitored by the traffic monitoring system. A sliding average calculator coupled to the road segment identifier determines an average speed corresponding to matched data samples for a particular one of the road segments in response to a predetermined sliding window. A state change detector coupled to the sliding average calculator detects a traffic state change at the road segment in response to the average speed in the predetermined sliding window determined at first and second times. A congestion alerting mechanism coupled to the state change detector routes notifications when the respective road segment state changes (either to a congested state or a clear state).

20 Claims, 6 Drawing Sheets

VEHICLE TRAFFIC MONITORING USING CELLULAR TELEPHONE LOCATION AND VELOCITY DATA

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to monitoring vehicular traffic on roadways, and, more specifically, to utilizing automatic location and velocity information provided by mobile communication devices (e.g., cellular phones, PDA's, and laptops communicating via CDMA, CPDP, GSM/GPRS, 802.11 expansion cards) to detect traffic congestion.

Many different techniques have been investigated for monitoring vehicular traffic flows in order to identify areas of congestion or lane blockages so that other traffic can be re-routed away from the problem. The monitoring devices in typical prior art systems (such as cameras, radar sensors, magnetic sensors, and weight sensors) have been deployed in or around the roadway in order to detect passing cars and trucks. With the sensors being fixed in place, coverage is limited to the areas where the sensors have been installed. In a large area (such as a metropolitan area), the large number of sensors that is required would result in high cost. In addition, many traffic problems do not occur at these fixed locations but instead occur at locations not covered by a sensor. Furthermore, a communication system and a data processing system must be provided in order to consolidate the sensor data for analysis, which is also very expensive.

It is known to process traffic data using statistical methods to characterize a traffic flow. Such methods, however, can tie up an excessive amount of computational resources and/or often depend on significant human intervention, To reduce the cost and increase the reliability of a traffic monitoring system, it would be desirable to avoid excess computations and human intervention.

With the proliferation of mobile communication devices (e.g., cellular telephones, PDA's, laptops, etc . . . ) use in vehicles, an opportunity has been seen to utilize the mobile communication devices or the carrier's wireless communication system itself for providing position sensors to monitor vehicle movement. Particularly in the United States, automatic location identification (ALI) capability within a cellular telephone system is being mandated by law so that the geographic position of a caller to emergency services is instantly transmitted to the emergency service provider (referred to as enhanced 911 services). A caller's position can be determined by providing the location finding capability in the cellular network (e.g., by triangulation), using a location capability in the mobile communication devices, or both working together.

A solution being widely adopted employs global position system (GPS) technology with a GPS receiver being built into each cellular phone. Along with geographic position coordinates (i.e., longitude and latitude), a GPS receiver typically determines the instantaneous velocity (i.e., speed and heading) at which the receiver is moving. When the cellular phone is carried in a motor vehicle, the position and velocity information detected with the GPS receiver can be used to identify traffic conditions of the roadway on which the vehicle is traveling.

In order to provide accurate and reliable characterization of traffic conditions, it is necessary to obtain a sufficient population of data samples (i.e., proportion of sampled vehicles to total vehicles). As the mandate for position-enabled cellular phone service ramps up, a critical mass will be reached so that location and velocity data from phones will be sufficient to characterize traffic conditions.

Statistical analysis of vehicle data intended to identify trends in traffic volume, or flow, usually consume large amounts of computational resources. It is important to quickly detect the occurrence of an accident or other road blockage, as well as the clearance of the accident or re-opening of the road in order to take effective traffic management actions. Yet, it is equally important to avoid any false detections from the anomalous behavior of a small number of vehicles or from data errors (e.g., a car or two pulling off of the road to change drivers). Consequently, data must be aggregated and a certain amount of data processing cannot be avoided (such as, data filtering of spurious data, aggregation by road segment, and aggregation by direction of travel). As large amounts of data are collected, efficient methods are needed for automatically analyzing the data to detect the road conditions of interest.

SUMMARY OF THE INVENTION

The present invention provides the advantages of efficient sorting of incoming location and velocity data from mobile telephones, efficient use of processing resources, and a fast response time to changes in traffic conditions.

In one aspect of the invention, a vehicular traffic monitoring system communicates with a plurality of mobile communication devices carried in moving vehicles and capable of determining their respective geographic positions and velocities. A data collector receives data samples from the plurality of mobile communication devices, each data sample comprising instantaneous location and velocity information of a respective mobile device at a respective time. A road segment identifier is coupled to the data collector for finding matching data samples wherein a respective instantaneous location corresponds to one of a plurality of road segments monitored by the traffic monitoring system. A sliding average calculator coupled to the road segment identifier determines an average speed corresponding to matched data samples for a particular one of the road segments in response to a predetermined sliding window. A road segment is comprised of a portion of a roadway with all lanes moving in the same direction. A state change detector coupled to the sliding average calculator detects a traffic state change at the road segment in response to the average speed in the predetermined sliding window determined at first and second times. A congestion alerting mechanism coupled to the state change detector routes either a congesting/congested state or a clearing/clear state notification for the respective road segment in response to the detected traffic state change. The state change detector may preferably detect a rapid variance in the average speed.

DETAILED DESCRIPTION OF PREFERRED EMBODIMENTS

Figure 1:
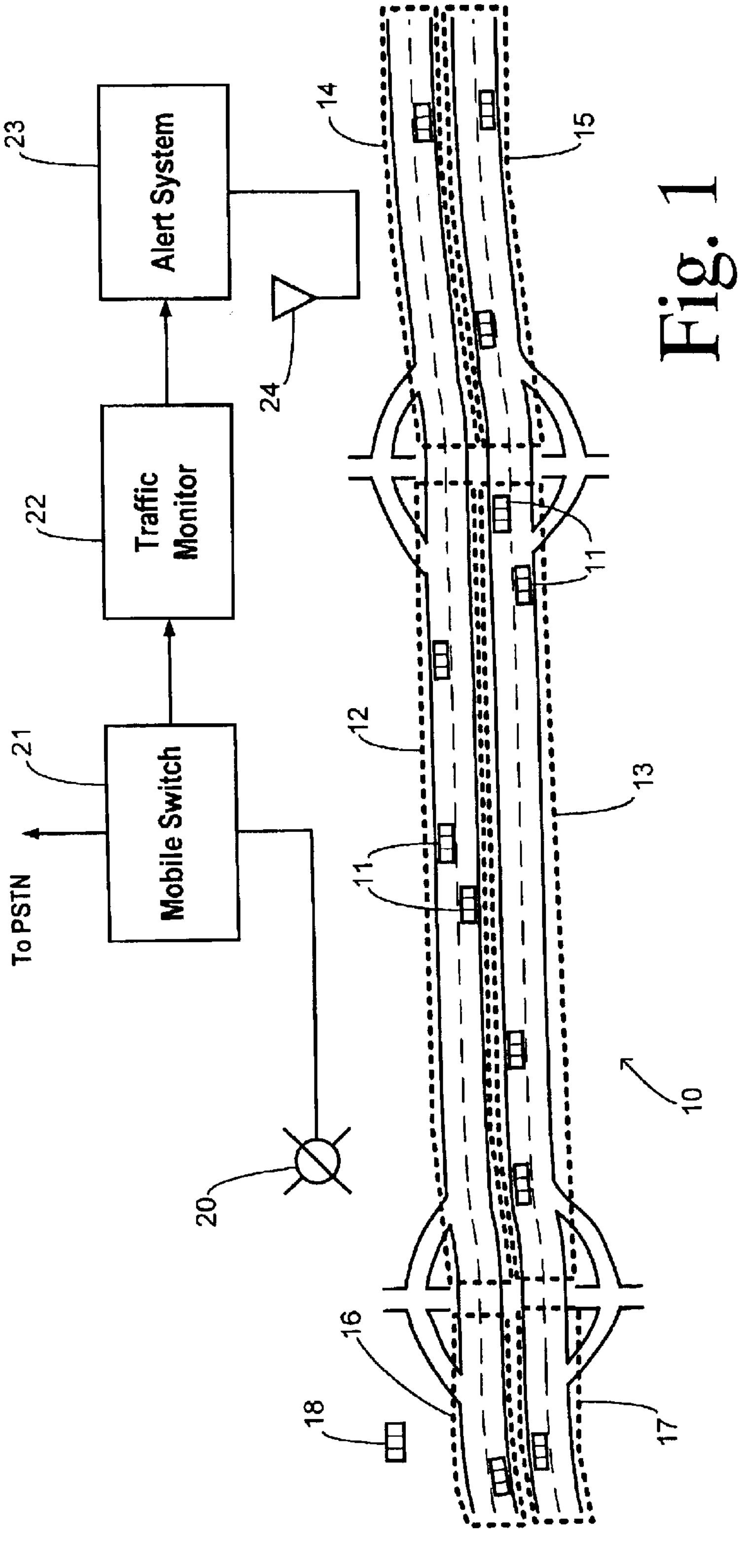
FIG. 1 is a diagram showing a traffic monitoring system communicating with cellular phones in vehicles traveling on a roadway.

Referring to FIG. 1, a roadway 10 has a plurality of vehicles 11 traveling thereon. Certain ones of vehicles 11 are carrying cellular telephones or other wireless mobile communications devices that are powered on and in communication with one or more fixed base stations, such as a cellular tower 20. In moving along roadway 10, vehicles 11 pass through predefined road segments 12–17, for example. Each road segment preferably comprises a section of roadway 10 for traveling in one direction (e.g., the GPS velocity measure includes directionality that is used to place a vehicle on the road segment for a particular direction). Alternatively, if GPS velocity values are not available, the relative movement between two points in time can be used to determine the direction of travel of a particular vehicle (although this would not usually be necessary since part of the FCC requirement for mobile 911 includes velocity data).

Each road segment is predefined to capture a distinct area of isolated traffic, such as a section of roadway between consecutive exits of a highway or consecutive intersections of a surface street. The segment may optionally be further defined by a maximum segment length (excessively large segments will have too many samples that are only indirectly effected by a traffic event—that will tend to "water down" the effect of the traffic event on the sliding average). Thus, if a traffic blockage occurs in a particular road segment then all vehicles within the segment are affected and other vehicles can avoid the blockage if they can be routed away from the particular road segment. In addition, the communications device user has a better opportunity to adjust ETA (estimated time of arrival) expectations.

Except for any cellular units with an on-board GPS receiver for which geographic position monitoring has been deactivated by the cellular device user, cellular devices in communication with tower 20 transmit data samples containing the geographic coordinates and current velocity of travel of the devices. In the present invention, it is assumed that if the geographic coordinates of a particular cellular device match (i.e., coincide with) the coordinates of a road segment then the cellular phone is being carried in a moving vehicle that is traveling on or through the road segment. Other cellular devices, such as a phone not currently carried in a vehicle or a phone carried in a vehicle but not currently on a monitored roadway (such as a phone in a parked vehicle 18), may provide data samples but these are not used since they would not have position coordinates corresponding to a monitored road segment.

During a registration operation as described below, each cellular phone can provide one or more data samples to characterize the traffic flow for the road segment. The data samples are transmitted wirelessly to cellular tower 20 which forwards them to a mobile telephone switching office or mobile switch 21. Mobile switch 21 is connected to a public switched telephone network (PSTN) for establishing telephone calls. Data samples are forwarded by mobile switch 21 to a traffic monitoring system 22 which processes the data samples to analyze traffic conditions (e.g., detect changes in traffic congestion) for a plurality of road segments. An alert system 23 receives an indication from traffic monitor 22 when congestion is detected in a road segment and provides a notification to motorists and/or traffic control authorities for taking action to relieve the congestion or to avoid it. Alert system 23 may for example comprise a broadcast radio service for broadcasting traffic information via an antenna 24 (such as traffic announcements provided in the radio data system, RDS) or may comprise a system of roadside displays for providing traffic warnings and detours. Alternatively, alerts may be routed back to the mobile switch where they are transmitted to mobile devices destined for the congested area (e.g., those requesting travel time information including that segment).

Figure 2:
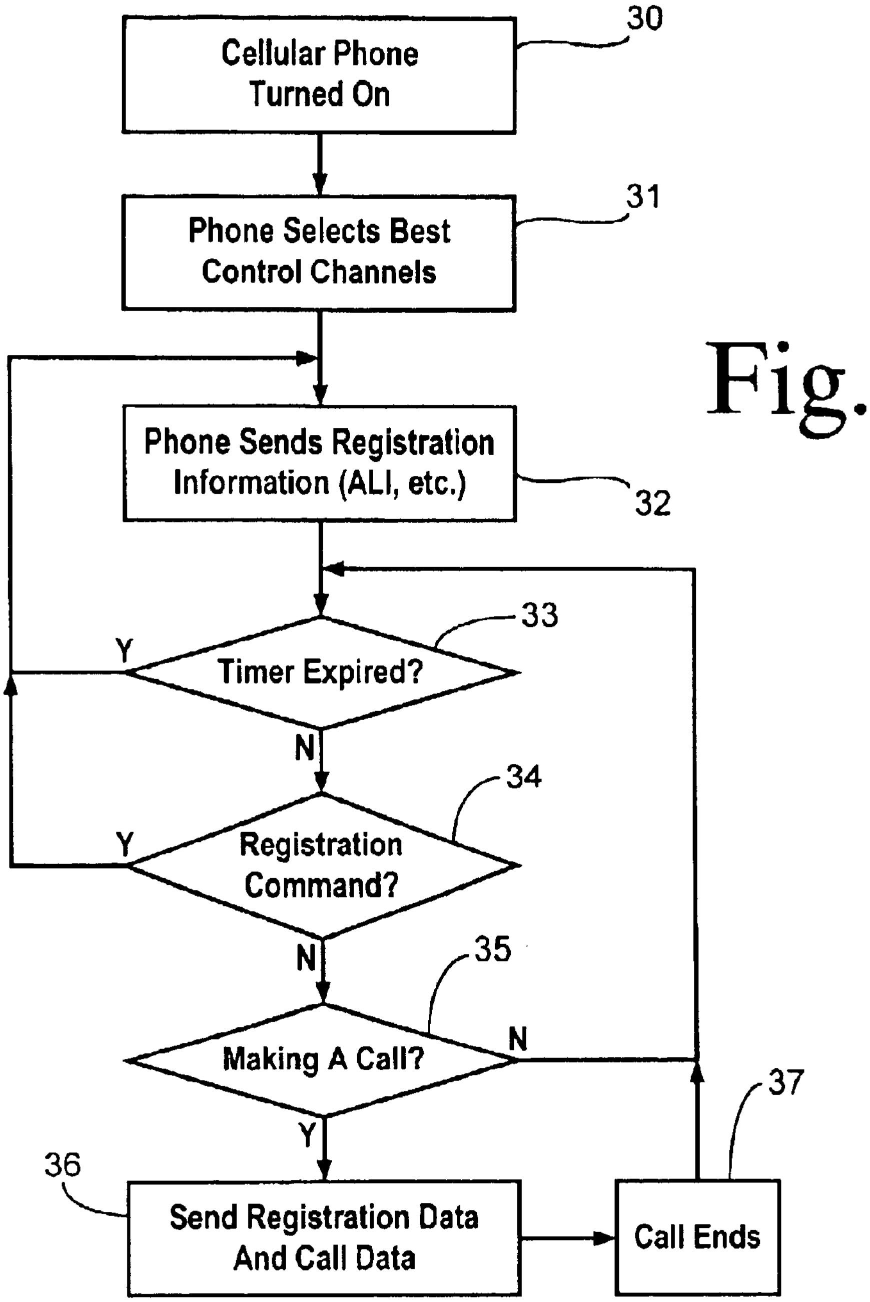
FIG. 2 is a flowchart of a preferred method for obtaining a stream of data samples from a particular phone.

A phone registration process of the present invention is shown in FIG. 2. At step 30, a cellular phone is powered on. During an initialization process, the phone searches through control channel frequencies of potential cellular sites to find the best (e.g., strongest) received signal in step 31. The phone chooses the corresponding cellular site for establishing a link and transmits a registration message in a reverse communication channel to the chosen cellular site in step 32. The registration message includes at least a phone number, serial number (ESN), automatic location identification (ALI) of the current location, and velocity.

In order to provide a steady stream of data samples, the registration operation occurs repeatedly for as long as the cellular phone remains on and is within range of a cellular site. A re-registration can be triggered within the phone at fixed intervals (a configurable time or at device known "segment" intervals), or in response to a drop of signal strength below a threshold level. Thus, a check is made in step 33 to determine whether a timer has expired (e.g., every 10 seconds from the previous registration operation). If the timer has expired, then a return is made to step 32 to perform a registration.

Re-registration can also be triggered by a request from the cellular network (e.g., from the traffic monitoring system when a data sample is needed for the area where a particular phone was located during its last registration or is projected to be currently based upon registration information). Thus, a check is made in step 34 to determine whether a registration command has been received. If so, then a return is made to step 32 to perform a registration. If not, then a check is made in step 35 to determine whether the phone user is making a telephone call. If not, then a return is made to step 33 to continue checking for the events that initiate a re-registration.

If the phone user is making a call, then registration data and call set-up data are sent in step 36. It is conventional for a cellular phone to send registration data when a call is being initiated. In the present invention, it is also possible to continue to poll a phone for updated data samples during a telephone call. After a call ends in step 37, a return is made to step 33 to continue checking for the events that initiate a re-registration.

Figure 3:
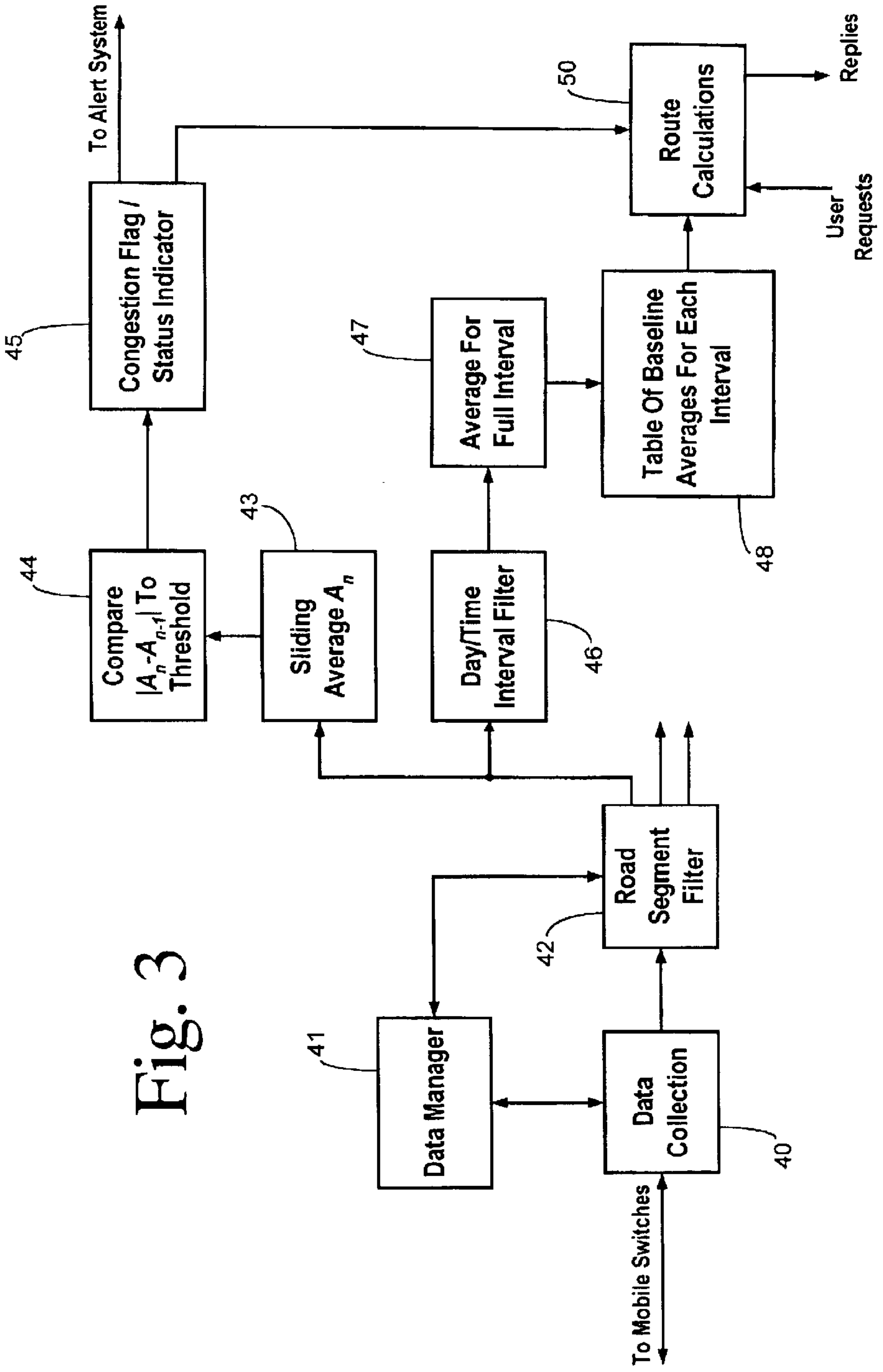
FIG. 3 is a block diagram of one preferred embodiment of a monitoring system of the present invention.

FIG. 3 shows one embodiment of a traffic monitoring system in greater detail. A data collection unit 40 interfaces with mobile switches to receive data samples from active phones. A data manager 41 coupled to collection unit 40 and to a road segment filter 41 evaluates the sufficiency of data being collected. In the event that insufficient data is being received corresponding to a particular road segment, then data manager 41 can initiate commands for obtaining registration operations for phones on the road segment. If more data samples are being received than are necessary, then data manager 41 can limit the number of data samples forwarded by data collection unit 40 to road segment filter 42 or it may alter the re-registration interval configuration on one or more devices.

Road segment filter 42 includes a database of geographic coordinates corresponding to each road segment being monitored by the traffic monitoring system. The location coordinates of an incoming data sample are compared to the database in an attempt to match the data sample to a road segment. When a match is found, the data sample is sent to a data processing section corresponding to the matching road segment. For one particular road segment, an incoming data sample is coupled to a sliding average calculator 43 for determining a recursive sliding average $A_n$ of vehicle speed in the road segment. Sliding average $A_n$ is determined according to a predetermined window size containing a predetermined number of vehicle speed samples. The predetermined number depends on variables such as road type, number of lanes, total traffic volume, and other factors. A typical value is in the range of about 5 to about 20 (note that the lower the value the more sensitive to traffic events the mechanism becomes). The use of a recursive sliding average (wherein a new value for the average is determined from the previous average value as modified using a new data point) to characterize the traffic flow at any particular moment provides efficient use of processing resources while maintaining a fast response time to changes in condition and minimizing false detections. For each incoming speed sample $S_n$, the sliding average $A_n$ is found according to the recursive formula:

$$A_n = \frac{A_{n-1}(W-1)+S_n}{W}$$

where W is the window size (note that $A_{n-1}$ must be initialized to $S_1$). For example, with the following set of reported speeds: 25, 32, 27, 35, 20, 33, 28; and a window size of 5, the sliding averages would be as follows: (25(5−1)+25)/5)=25, (25(5−1)+=)/5+32 26.4, (26.4(5−1)+27)/5=26.52, (26.52(5−1)+35)/5=28.22, (28.22(5−1)+20)/5=26.58, (26.58(5−1)+33)/5=27.86, (27.86(5−1)+28)/5=27.89. The usual method for calculating a “static” (non-moving) non-recursive average would achieve the following: 25+32+27+35+20+33+28=200, 200/7=28.57.

In one preferred embodiment, a state change between a congested traffic state and a clear traffic state is detected in a state change detector 44 which compares s the absolute value of the difference between the values of the sliding average $A_n$ at two different times (e.g., the difference between consecutive averages $A_{n-1}$ and $A_n$ or averages separated by a fixed time period) with a predetermined threshold representative of an acceleration or deceleration of traffic that corresponds to a state change in the ability of traffic to move through the road segment. If the difference ($A_n$-$A_{n-1}$) is negative then a deceleration indicative of an onset of congestion is detected; if positive, then an acceleration indicative of the clearance of congestion is detected. Alternatively, the difference could be compared to positive and negative thresholds to account for differences in traffic behavior during the two kinds of events (e.g., traffic clearing is generally more gradual than congestion).

A congestion flag/status indicator 45 is set according to the current state of traffic within the corresponding road segment. The congestion flag is coupled 1) to the alert system so that notice of the blockage or clearing of the road segment can be communicated to vehicles and to road authorities, and 2) to a route calculation block 50 of a navigation system for providing route assistance to users.

Data samples corresponding to the particular road segment are also coupled from road segment filter 42 to a day/time interval filter 46 which defines predetermined time-of-day intervals corresponding to daily road usage patterns. The intervals need not be all of the same duration, but can instead follow times of typical usage patterns with shorter intervals occurring during rush hours, for example. Intervals may be constructed for each day of the week or can be aggregated according to week days and weekend days, for example. Data samples are input to an average calculator 47 which preferably determines an average speed over the full current interval. At the end of the current interval, the overall average is transferred to a table 48 for storing baseline averages for each predefined interval. The table value for an interval may preferably be determined according to a sliding average of consecutive values of the overall average for the interval in order to account for medium to long term changes in traffic patterns. The resulting baseline average quantifies an expected or predicted traffic flow which is provided to route calculation block 50 to assist in assessing optimum routes. Route calculation block 50 receives user (i.e., subscriber) requests for generating routes from an origin to a destination and/or providing a travel time estimate of a specified route and generates replies based in part on the baseline averages for particular road segments and the congested state of any road segments in any route being evaluated for the requested timeframes.

Figure 4:
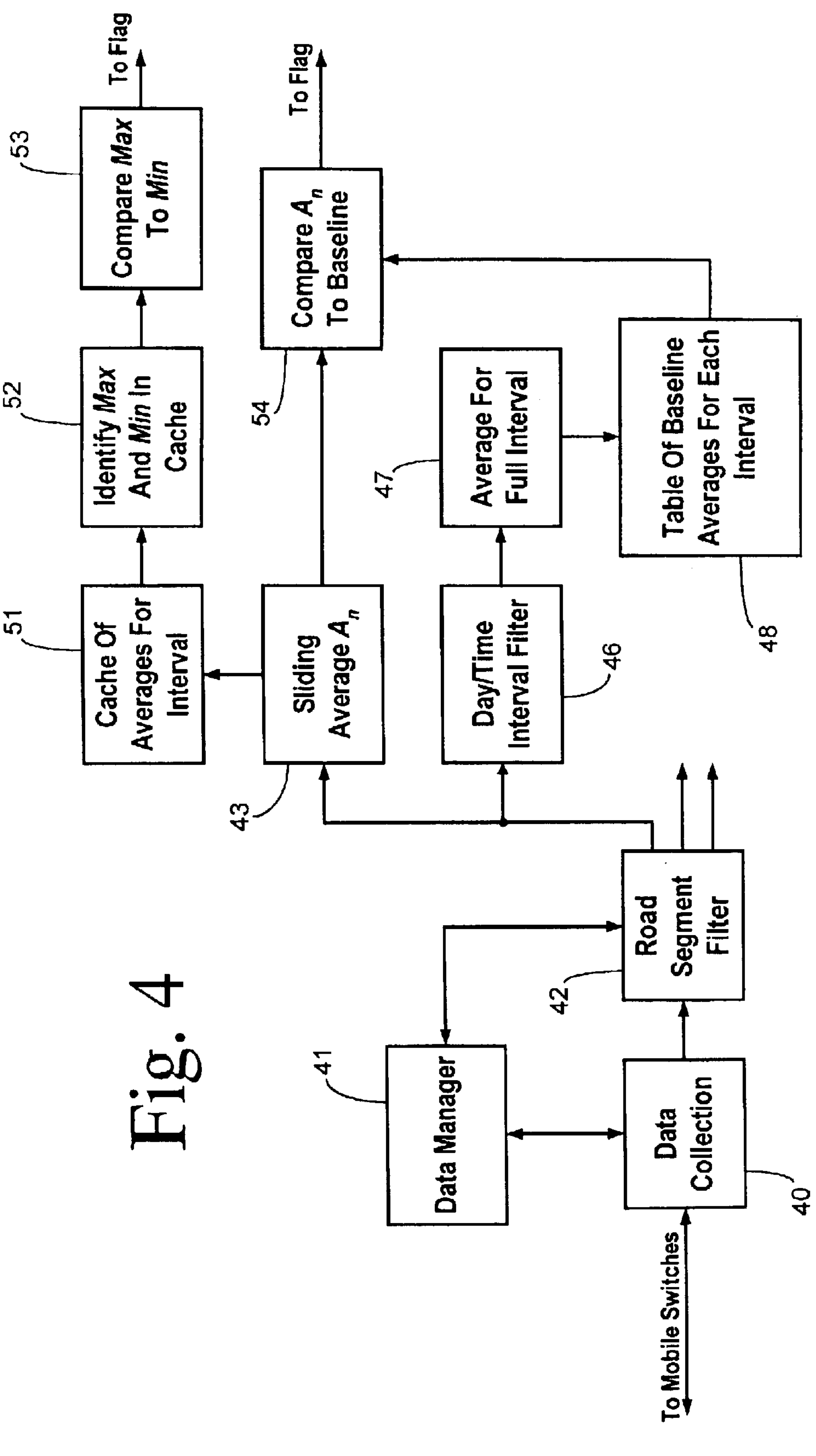
FIG. 4 is a block diagram of another preferred embodiment of a monitoring system of the present invention.

FIG. 4 shows other preferred embodiments for detecting a state change of the traffic state in a particular road segment. Sliding averages An from calculator 43 are provided to a cache 51 which stores the averages during a current time-of-day interval or a portion thereof. A selection block 52 identifies a Max value and a Min value from cache 51. These values are compared in a comparison block 53 to detect a state change (i.e., a state change occurs when the fastest and slowest average speeds during the interval are sufficiently far apart). Any spurious outlying samples are preferably discarded from this step. The difference between the Max and Min values can be compared to a fixed threshold. Alternatively, the relative magnitudes of Max and Min can be compared, e.g., using a threshold that is proportional to one of the values. For example, a state change may be detected if Max is greater than (1+δ)Min, where δ is a predetermined factor for defining the relative difference in speeds during the onset or clearing of a traffic blockage.

In another alternative, FIG. 4 also shows a comparison block 54 for comparing a current sliding average speed $A_n$ with the baseline average speed for the corresponding time interval from table 48. A state change may be detected when the difference between these values exceeds a threshold.

Figure 5:
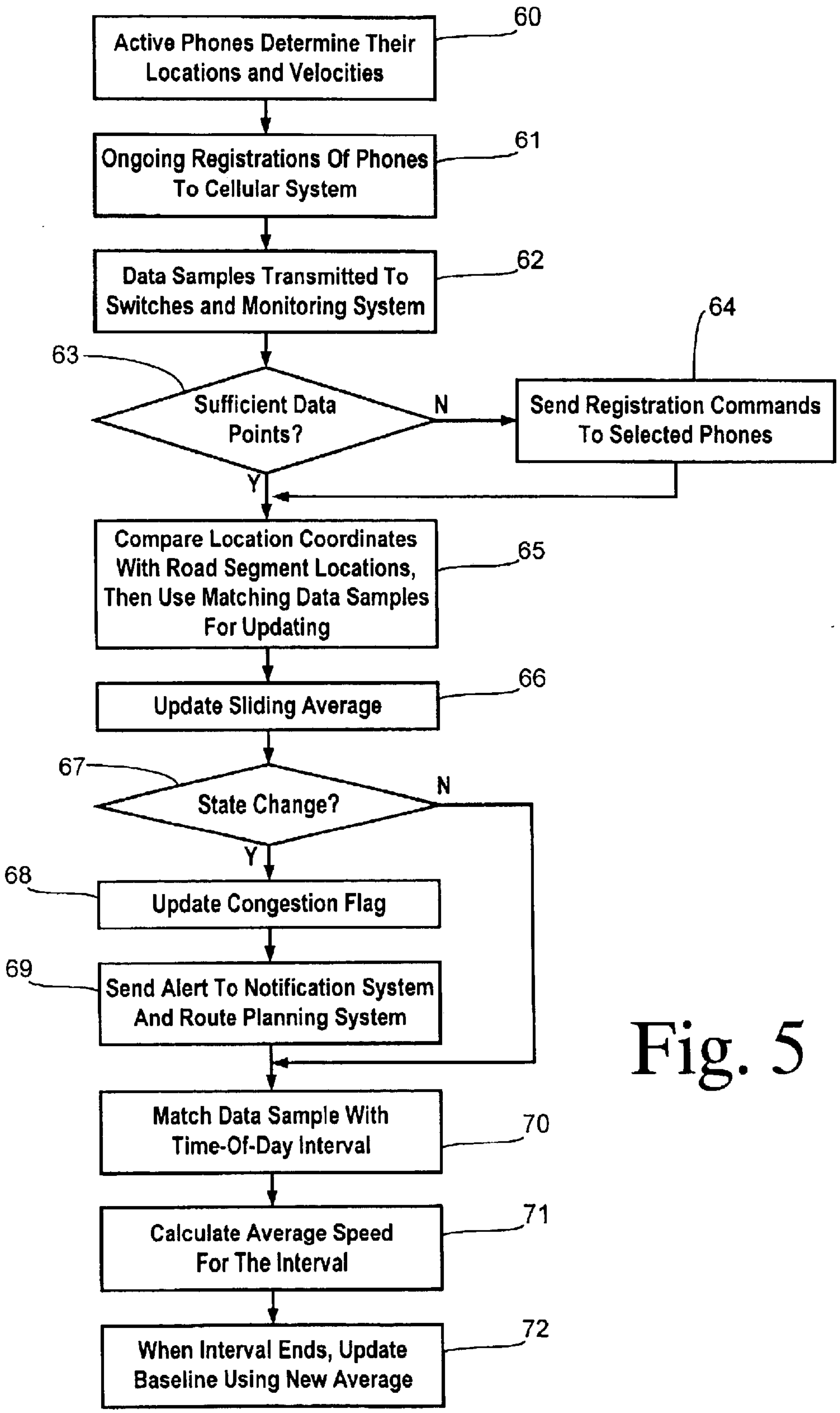
FIG. 5 is a flowchart showing a preferred method of collecting and processing data samples.

FIG. 5 shows one preferred embodiment of an overall method of the present invention. In step 60, any active cellular or other wireless mobile communication device (or their networks) determine their locations and instantaneous velocities (i.e., speed and direction of motion). In step 61, the devices conduct ongoing registrations wherein the location and velocity data is transmitted to base stations in the mobile device system. In step 62, the base stations transfer the data samples to the traffic monitoring system.

The traffic monitoring system checks whether sufficient data points are being collected in step 63. If not, then registration commands (or any commands that may be needed to cause certain phones to transmit location and velocity data—generally a paging request or similar command) are sent in step 64.

In step 65, the location coordinates of incoming data samples are compared with the location coordinates of the road segments being monitored. When matches are found, then the corresponding data samples are kept for use in updating conditions for the matching road segment. When no match is found, the data sample is discarded.

For matched data samples, the sliding average is updated in step 66. The new value of the sliding average is checked in step 67 to determine whether a state is change has occurred. If a change occurred, then the congestion flag is updated in step 68 and an alert which identifies the state change is sent in step 69 to the alert system (e.g., for notifying drivers) and the route planning system (e.g., so that congested segments are not included in generated routes).

Following the notifications in step 69 or after detecting that a state change did not occur in step 67, a data sample is matched to a corresponding time-of-day interval in step 70. The overall average speed for the interval is updated in step 71 (preferably from a separate sliding average value initialized at the start of the sample interval). When the interval ends, then the baseline average for the interval is updated in response to the current interval average in step 72.

Figure 6:
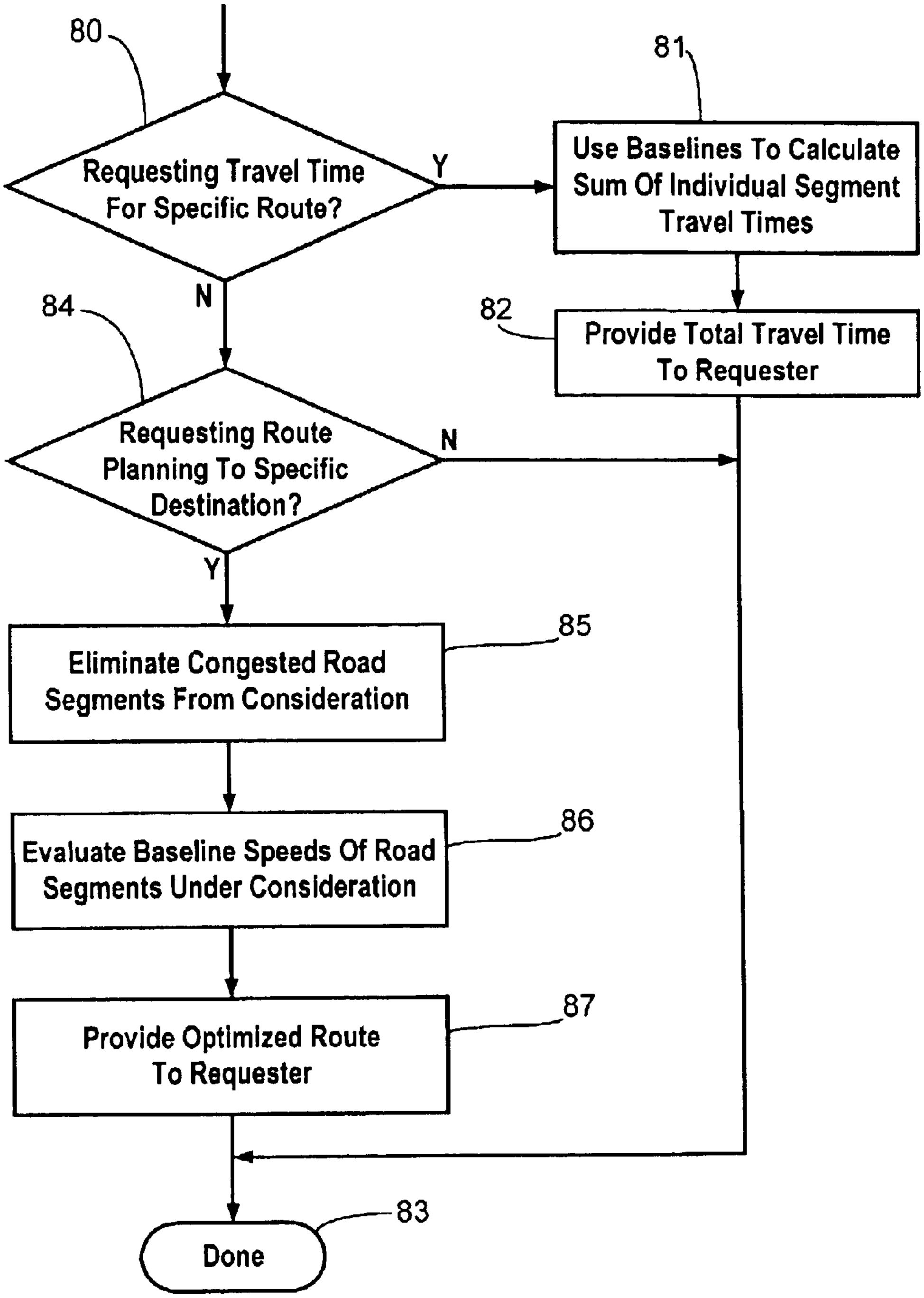
FIG. 6 is a flowchart of a preferred method of responding to requests for vehicle navigation information using the monitored conditions of the present invention.

The congestion flag and baseline averages generated by the present invention may be used to improve route planning and real-time traffic services as shown in FIG. 6. A user or subscriber to a route planning/navigation service may include the cellular phone users whose cellular phones provide the data samples for monitoring traffic. Moreover, a condition of obtaining the route planning/navigation service may be that the cellular phone must be set to provide location data to the cellular system.

In step 80, a check is made whether a service request is for a determination of the travel time to traverse a specific route at a specific time. If so, then the baseline averages (i.e., length of road segment divided by baseline average speed) for the specified time are summed for road segments between the origination and termination of the specified route. If the specified time is the present time, then the current sliding averages can be used instead of baseline averages. Note also that if the time required to travel a given number of segments crosses time interval boundaries, the travel time in the segments within the different time intervals must use the baseline value for the interval they are projected to occur within. In step 82, the total travel time is reported back to the requester and the method is done at step 83.

If not a request for travel time, then a check is made in step 84 to determine whether generation of an optimized route between an origination and a destination is being requested. If not, then the method exits at step 83. Otherwise, any congested road segments are eliminated from consideration for the optimized route in step 85. In step 86, road segments are identified that can potentially be used in a route and their baseline speeds and or travel times are evaluated to determine an optimized route using known techniques. A final optimized route is reported back to the requester in step 87.

What is claimed is:

1. A vehicular traffic monitoring system for communicating with a plurality of mobile telephones carried in moving vehicles and capable of determining their respective geographic positions and velocities, comprising:

a data collector for receiving data samples from said plurality of mobile telephones, each data sample comprising instantaneous location and velocity information of a respective mobile telephone at a respective time;

a road segment identifier coupled to said data collector for finding matching data samples wherein a respective instantaneous location corresponds to one of a plurality of road segments monitored by said traffic monitoring system;

a recursive sliding average calculator coupled to said road segment identifier for determining an average speed corresponding to matched data samples for a particular one of said road segments in response to a predetermined sliding window having a predetermined number of said matched data samples wherein said average speed is determined as a recursive sliding average $A_n$ in response to an nth one of said matched data samples $S_n$, a previous average speed $A_{n-1}$, and a predetermined number W of matched data samples in said predetermined sliding window;

a state change detector coupled to said recursive sliding average calculator for detecting a traffic state change at said road segment in response to said average speed in said predetermined sliding window determined at first and second times; and a congestion indicator coupled to said state change detector, said congestion indicator indicating either a congested state or a clear state of said respective road segment in response to said detected traffic state change.

2. The traffic monitoring system of claim 1 further comprising:

a notification system coupled to said congestion indicator for informing at least some of said moving vehicles to avoid a respective road segment when its respective congestion indicator indicates a congested state.

3. The traffic monitoring system of claim 1 further comprising:

a route calculator coupled to said congestion indicator for determining a preferred route between a current position and a desired destination provided in a route request from a user, said preferred route avoiding any of said road segments for which a respective congestion indicator indicates a congested state.

4. The traffic monitoring system of claim 1 further comprising:

an interval identifier coupled to said road segment identifier for determining a respective recurring time-of-day interval of said data samples for a respective road segment;

an averager coupled to said interval identifier for determining an overall average speed corresponding to said data samples for said recurring time-of-day interval; and a baseline database storing baseline averages corresponding to a plurality of said recurring time-of-day intervals for said plurality of road segments.

5. The traffic monitoring system of claim 4 further comprising:

a route calculator coupled to said baseline database for determining a preferred route between a current position and a desired destination provided in a route request from a user, said preferred route being determined in response to said baseline averages of said road segments for a respective time-of-day interval corresponding to said route request.

6. The traffic monitoring system of claim 4 further comprising:

a route calculator coupled to said baseline database and said congestion indicator for determining a preferred route between a current position and a desired destination provided in a route request from a user, said preferred route avoiding any of said road segments for which a respective congestion indicator indicates a congested state, and said preferred route being determined in response to said baseline averages of said road segments for a respective time-of-day interval corresponding to said route request.

7. The traffic monitoring system of claim 1 wherein said mobile telephones operate within a wireless cellular network, wherein each one of said data samples is obtained from a respective mobile telephone during a registration operation to said wireless cellular network, and wherein said data collector is coupled to said wireless cellular network for initiating registration operations for selected mobile telephones.

8. The traffic monitoring system of claim 1 wherein said state change detector calculates a difference between said average speeds determined at first and second times and compares said difference with a threshold to detect said traffic state change.

9. The traffic monitoring system of claim 1 wherein said state change detector includes a cache for storing a plurality of said average speeds during a predetermined period including said first and second times, wherein said state change detector identifies a maximum average speed and a minimum average speed within said cache, and wherein said traffic state change is detected when a difference in relative magnitude of said maximum average speed and said minimum average speed is greater than a threshold.

10. The traffic monitoring system of claim 1 wherein said average speed is determined by said recursive sliding average calculator according to a recursive formula comprising:

$$A_n = \frac{A_{n-1}(W-1)+S_n}{W}.$$

11. A method of monitoring vehicular traffic on a plurality of road segments, said method comprising the steps of:

receiving data samples from a plurality of mobile telephones carried in moving vehicles and capable of determining their respective geographic positions and velocities, each data sample comprising instantaneous location and velocity information of a respective mobile telephone at a respective time;

matching data samples with respective road segments whenever a respective instantaneous location corresponds to a stored location of a respective one of said road segments;

determining an average speed corresponding to a recursive average of said matched data samples for a particular one of said road segments in response to a predetermined sliding window having a predetermined number of said matched data samples wherein said average speed is determined as a recursive sliding average $A_n$ in response to an nth one of said matched data samples $S_n$, a previous average speed $A_{n-1}$, and a predetermined number W of matched data samples in said predetermined sliding window;

detecting a traffic state change at said road segment in response to a change in said average speed in said predetermined sliding window determined at first and second times; and indicating either a congested state or a clear state of said respective road segment in response to said detected traffic state change.

12. The method of claim 11 further comprising the step of informing at least some of said moving vehicles to avoid a respective road segment when its respective congestion indicator indicates a congested state.

13. The method of claim 11 further comprising the step of determining a preferred route between a current position and a desired destination specified in a route request from a user, said preferred route avoiding any of said road segments for which a respective congestion indicator indicates a congested state.

14. The method of claim 11 further comprising the steps of:

determining a respective recurring time-of-day interval of said data samples for a respective road segment;

determining an overall average speed corresponding to said data samples for said recurring time-of-day interval; and storing baseline averages corresponding to a plurality of said recurring time-of-day intervals for said plurality of road segments.

15. The method of claim 14 further comprising the step of determining a preferred route between a current position and a desired destination specified in a route request from a user, said preferred route being determined in response to said baseline averages of said road segments for a respective time-of-day interval corresponding to said route request.

16. The method of claim 14 further comprising the step of determining a preferred route between a current position and a desired destination specified in a route request from a user, said preferred route avoiding any of said road segments for which a respective congestion indicator indicates a congested state, and said preferred route being determined in response to said baseline averages of said road segments for a respective time-of-day interval corresponding to said route request.

17. The method of claim 11 wherein said mobile telephones operate within a wireless cellular network, wherein each one of said data samples is obtained from a respective mobile telephone during a registration operation to said wireless cellular network, and wherein said data collector is coupled to said wireless cellular network for initiating registration operations for selected mobile telephones.

18. The method of claim 11 wherein said step of detecting a traffic state change is comprised of:

calculating a difference between said average speeds determined at first and second times; and comparing said difference with a threshold.

19. The method of claim 11 wherein said step of detecting a traffic state change is comprised of:

storing in a cache a plurality of said average speeds during a predetermined period including said first and second times;

identifying a maximum average speed and a minimum average speed within said cache; and detecting whether a difference in relative magnitude of said maximum average speed and said minimum average speed is greater than a threshold.

20. The method of claim 11 wherein said recursive average is determined according to a recursive formula comprising:

$$A_n = \frac{A_{n-1}(W-1)+S_n}{W}.$$

* * * * *